Figure 1:
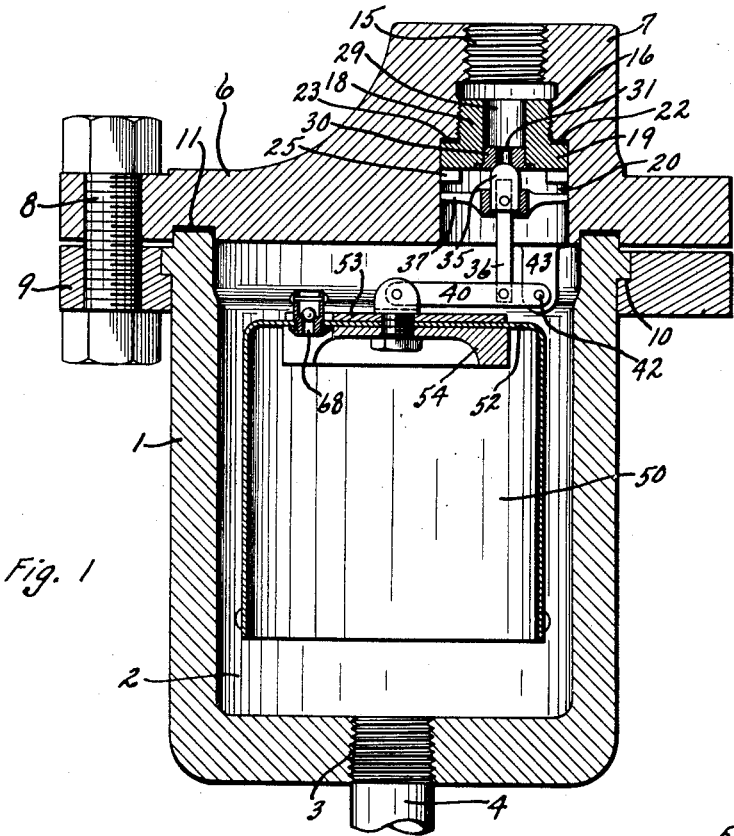

Feb. 7, 1933.   L. P. STRONG   1,896,528
STEAM TRAP
Filed March 14, 1931

INVENTOR
Leslie P. Strong
BY
Brockett, Hyde, Higley & Meyer
ATTORNEYS

Patented Feb. 7, 1933

1,896,528

UNITED STATES PATENT OFFICE

LESLIE P. STRONG, OF LAKEWOOD, OHIO, ASSIGNOR TO THE CLARK MANUFACTURING COMPANY, OF CLEVELAND, OHIO, A CORPORATION OF OHIO

STEAM TRAP

Application filed March 14, 1931. Serial No. 522,585.

This invention relates to improvements in inverted bucket steam traps, such as are used with steam containing appliances for removing therefrom air and water of condensation. More particularly, the present invention relates to improvements in the vent means of the inverted buckets of such traps.

In present-day invented bucket steam traps, it is the practice to provide the trap bucket and more particularly, its top wall, with a small vent orifice, upwardly through which passes into the top portion of the trap chamber any air which may be within the trap bucket. Some of the steam within the trap bucket also passes out through this vent orifice, but the chief function of said orifice is to permit the escape from the trap bucket of the air therein.

Inasmuch as the inverted trap bucket is buoyed or maintained in an elevated position by the pressure of the air and/or steam within said bucket, it follows that escape of air (and, of course, steam) from said bucket through its vent orifice effects a reduction in the buoyant effect exerted upon said bucket. Reduction of this buoyant effect upon the bucket in time causes said bucket to fall, with consequent opening of the trap outlet valve which is actuated by the rise and fall of said bucket. Due to the fact that the vent orifice of the bucket is quite small and hence the rate of escape of air and steam therethrough very low, said bucket does not fall very far until the buoyant effect thereon is increased sufficiently to return said bucket to its fully elevated position, with consequent complete closing of the trap outlet valve, said increase being effected by the steam and/or air remaining within the trap bucket, aided by steam and/or air which may have just entered the trap chamber and hence the trap bucket.

The result is that the trap bucket is always more or less in a balanced condition, that is, the weight of said bucket is usually or normally opposed by sufficient steam and/or air pressure to maintain said bucket in an elevated position. The bucket frequently falls, but the fall is of slight extent and the bucket is almost immediately returned to its elevated position with consequent complete closing of the trap outlet. The trap outlet is therefore frequently opened, but the opening of said outlet is of slight extent, and of extremely short duration, so that little water and/or air are permitted to be discharged from the trap at any one time.

These traps may, therefore, be said to be "continuously operating" traps, for they are almost continuously discharging some water and/or air. Such more or less continuous operation is necessary if the steam containing appliance to which the trap is connected is to be substantially completely freed of its water and air, since the trap discharges at any one time a comparatively small amount of water and/or air.

It is, therefore, the general object of the present invention to provide an improved inverted bucket steam trap so constructed and having such an operation that its outlet is periodically opened, to such an extent and for such a duration, that an appreciable portion of the water and air in the trap chamber can be discharged therefrom. With such a substantial discharge upon each opening of the trap outlet, it is obvious that said outlet need be opened only periodically. The present improved trap is, therefore, an "intermittently operating" trap.

More specifically, the object of the present invention is the provision of an inverted bucket steam trap having its bucket provided with improved vent means for controlling the escape from the trap bucket of air and steam therein. Said improved bucket vent means comprises a simple vent in the top wall of said bucket, said vent being normally almost completely closed by suitable valve means, such as a ball valve, positioned above said vent. By not completely closing said vent, a small vent, in the form of a small leak port, is at all times provided in the top wall of the bucket for the escape from the bucket of steam and air therein.

The ball valve of the present trap is of such weight that it normally rests upon its seat above said vent, against the pressure of the steam and/or air within the bucket. As the air and/or steam within the bucket slowly escapes from the bucket through the small vent always provided, the buoyant effect exerted upon the bucket by the air and/or steam remaining in the bucket is reduced, until finally the bucket starts to fall. Such falling of the bucket causes the ball valve to become separated from its seat, thereby completely opening the bucket vent, and the rushing through said vent of the steam and/or air remaining within said bucket causes said ball valve to remain separated from its seat. Therefore, sufficient steam and/or air within the bucket are permitted to escape therefrom through its now fully opened vent to cause said bucket to fall its maximum extent, thereby fully opening the trap outlet and effecting a substantial discharge from the trap, so far as water and air are concerned.

After such discharge of water and/or air within the trap, the trap bucket is returned to elevated position by the pressure of the incoming steam. In the interim, the ball valve has resumed its seat and has almost again completely closed the bucket vent. At each falling of the trap bucket, the ball valve is separated from its seat, with consequent complete falling of the trap bucket and complete opening of the trap outlet. Inasmuch as the trap discharges a substantial part of its water and air each time the trap bucket falls, since said bucket falls its maximum amount, it follows that the trap bucket does not fall and need not frequently, so that intermittent trap operation results.

Figure 2:
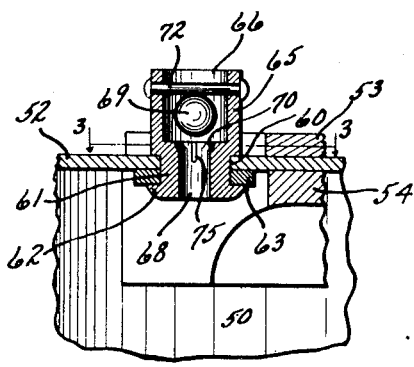
Figure 3:
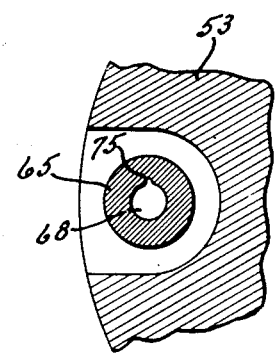

The present invention will be more readily understood, and further features thereof apparent, from the following description of one embodiment thereof, reference being had to the accompanying drawing in which Fig. 1 is a vertical sectional view of the present improved steam trap; Fig. 2 is an enlarged, vertical sectional view of the improved vent means of the trap bucket; and Fig. 3 is a detail cross-sectional view of said vent means on the line 3—3, Fig. 2.

The trap illustrated includes a generally cup-shaped metal casing 1, open at its top and having a generally cylindrical chamber 2 into which steam, water of condensation and air enter through the centrally disposed bottom inlet opening 3. Threaded or otherwise suitably secured in said opening is an inlet pipe 4 connected to the steam containing appliance from which the present trap is intended to remove air and water of condensation.

The chamber 2 of the trap casing is closed at the top by a metal cover 6 of generally circular shape in plan view and provided with a slightly off-center, generally cylindrical upright extension 7, preferably formed integral with the cover. The marginal portion of said cover is bolted or otherwise suitably connected, as at 8, to a horizontally disposed annular metal flange 9 shrunk upon or otherwise suitably secured to the top of the trap casing 1, said casing at its top and said flange having annular interlocking shoulders 10. For sealing purposes, an annular gasket 11 is preferably interposed between the cover 6 and the top of the trap casing.

The cover 6 and the cover extension 7 are together provided with a vertically disposed through-passageway, the upper and smallest portion 15 of which is threaded to receive the trap discharge or outlet pipe (not shown). The intermediate portion 16 of said passageway is also threaded and has secured therein the upper end portion 18 of a hard metal bushing, the lower enlarged end portion 19 of which lies within the lower, enlarged and unthreaded portion 20 of said cover and cover extension passageway. Said bushing is screwed up into said passageway until the upper annular surface of its lower enlarged end portion 19 engages the annular shoulder 22 formed by the enlargement of said cover and cover extension passageway. If desired, an annular sealing gasket 23 may be interposed between said cover shoulder 22 and the enlarged lower end portion 19 of said bushing, all as clearly shown in Fig. 1. For imparting rotary movement to said bushing in said cover and cover extension passageway, the lower enlarged end portion 19 of said bushing is provided with opposed lugs 25 depending from the bottom thereof.

Shrunk into or otherwise suitably secured in the lower end of a vertically disposed passageway 29 in said bushing is an exceptionally hard metal valve seat member 30 having a centrally disposed, vertically extending opening 31 therethrough. This opening 31 constitutes the outlet opening of the trap and therefore through which pass the water and air discharged from the trap.

This trap outlet opening 31 is controlled by a suitable valve 35 pinned or otherwise suitably mounted upon the upper end of a generally vertically disposed valve stem 36. For guiding said valve in its vertical movement within the lower, unthreaded portion 20 of the cover and cover extension passageway, into and out of engagement with the valve seat member 30, suitable guide means is provided in said passageway portion 20, said means comprising a central portion through an opening in which said valve passes and radially extending arm portions 37, as clearly shown in Fig. 1.

The lower end of the valve stem 36 is pinned or otherwise suitably connected to a lever 40, intermediate the ends of said lever, said lever being arranged in generally horizontal position at the top of the trap chamber 2. The outer end of said lever is pivotally mounted at 42 to a casing lug 43 arranged within the trap chamber 2 at the top thereof, while the inner end of said lever, which end terminates substantially at the central axis of the trap, has suitably mounted thereon an inverted bucket 50, the movement of which in the trap chamber 2 controls the movement of the valve 35 and hence the opening and closing of the trap outlet opening 31. The connection of said lever 40 to said bucket is at substantially the center of the top wall 52 of said bucket and to make this connection a firm one and to give said bucket the desired weight, a metal disk 53 and a generally circular block 54 are respectively arranged above and below the top wall 52 of said bucket, as illustrated.

To permit air within the trap bucket to escape therefrom into the top portion of the trap chamber 2, the marginal portion of the top wall 52 of said bucket is provided with an aperture 60. Simple apertures of this kind constitute the vent means for the inverted buckets of practically all steam traps now on the market, but in the present trap, suitable valve means is provided for controlling the flow of air (and, of course, steam) through the bucket aperture 60 from the space within said bucket.

In the present embodiment of the invention, the lower tubular stem portion 61 of a metal valve housing is suitably secured within said aperture 60, such as by beading the lower end of said stem portion outwardly, as at 62, beneath the bucket top wall 52 or, as shown, beneath a metal washer 63 surrounding said stem portion and lying up against said bucket top wall. Said valve housing is provided with a cup-shaped body portion 65 arranged above and seating upon the bucket top wall 52, said body portion having a chamber 66 open at its top and therefore in communication with the top portion of the trap chamber 2. At its bottom, said valve housing chamber 66 communicates with the slightly enlarged upper end of a vertically disposed passageway 68 extending through the valve housing stem portion 61, the lower end of said passageway being in communication with the space within the trap bucket.

Arranged within the valve housing chamber 66 is a suitable ball valve 69, of metal or the like, and adapted to almost completely close and open the upper end of the valve housing passageway 68, a tapered annular valve seat 70 being provided at the upper end of said passageway for engagement by said ball valve. To confine said ball valve within said housing chamber 66, a suitable pin 72 extends across the upper end of said chamber, the ends of said pin being mounted in suitable openings in the cylindrical wall of the body portion 65 of said housing.

As clearly indicated in the drawing, the metal disk 53 and the metal block 54, respectively arranged above and below the top wall 52 of the trap bucket, are cut-away adjacent the aperture 60 in the bucket top wall, thereby enabling the valve housing to be more easily and conveniently mounted in said aperture, as will be readily understood.

The ball valve 69 is of such weight that it normally rests upon its seat 70, in closing position with respect to the valve housing passageway 68. To permit the escape of a small quantity of air and/or steam at all times from within the trap bucket, a small leak groove 75 is provided in the valve seat 70. Therefore, even when the ball valve 69 is resting upon its seat, in closing position with respect to the valve housing passageway 68, a small vent is provided for the slow escape into the top of the trap chamber 2 of air and/or steam within the trap bucket.

As before mentioned, the ball valve 69 normally rests upon its seat 70, against the pressure of the steam and/or air within the trap bucket. Due to the escape, however, even though at a slow rate, of air (and some steam) from within the trap bucket through the leak groove 75, and due to the condensation of steam within the trap bucket, the pressure of the steam and/or air within the trap bucket is constantly being reduced. In time, the pressure of said steam and/or air is reduced to such an extent that it is no longer sufficient to maintain the trap bucket in an elevated position, with the result that said bucket starts to fall. The falling of said bucket causes the ball valve 69 to become separated from its seat 70, with consequent full opening of the valve housing passageway 68. The air and some of the steam within the trap bucket immediately rush upwardly and escape from the trap bucket through the now completely opened valve housing passageway 68 and the air and/or steam now rapidly rushing upwardly through said passageway serve to maintain the the ball valve 69 separated from its seat and hence maintain said valve housing passageway 68 fully open.

So much air and/or steam within the trap bucket escape through the now fully open valve housing passageway 68 that the trap bucket rapidly falls its maximum amount, with consequent complete opening of the trap outlet 31. The opening of said trap outlet causes water and air within the trap chamber 2 to be discharged therefrom, and since said outlet is fully open, and remains so far an appreciable period, a substantial discharge from the trap chamber is effected, so far as water and air are concerned.

As soon as the trap bucket reaches its lowermost position within the trap chamber 2, the ball valve 69 resumes its seat, and again almost completely closes the valve housing passageway 68. Steam entering the trap chamber 2 through the inlet conduit 4 in time returns the trap bucket to its elevated position, with consequent closing of the trap outlet 31. In this elevated position, the trap bucket remains until sufficient air and/or steam has escaped from the trap bucket through the leak passageway 75, and/or until sufficient steam within the trap bucket has condensed, to cause said bucket to again start to fall. When that occurs, the ball valve 69 is again separated from its seat and the fall of the trap bucket is continued to its maximum extent, as before explained.

Inasmuch as the trap outlet is completely opened each time the trap bucket falls, and for an appreciable period, since the trap bucket falls each time its maximum extent, a substantial discharge of water and air from the trap is effected upon each fall of the bucket. The trap bucket need not and does not, therefore, fall frequently, so that the present trap is what may be termed an "intermittently operating" trap.

While a ball valve mechanism is used in the present trap, it will, of course, be understood that other types of valve mechanism may be employed, and that other changes may be made in the present trap without departing from the spirit or the scope of the present invention.

What I claim is:

1. A steam trap, comprising a casing having a chamber and also having an inlet opening through which water, steam and air enter said chamber and an outlet opening through which water and air leave said chamber, valve mechanism for controlling said outlet opening, an inverted bucket arranged within said chamber for actuating said valve mechanism, said bucket being provided in its top wall with a vent and with a valve seat surrounding said vent, and a valve for closing and opening the major part of said vent, the remaining part of said vent being open at all times for vent purposes, said valve being arranged above said bucket vent and being of sufficient weight to enable it to normally rest upon its seat against the pressure of the air and/or steam within said trap bucket.

2. A steam trap, comprising a casing having a chamber and also having an inlet opening through which water, steam and air enter said chamber and an outlet opening through which water and air leave said chamber, valve mechanism for controlling said outlet opening, an inverted bucket arranged within said chamber for actuating said valve mechanism, said bucket being provided in its top wall with a vent aperture and with a valve seat surrounding said aperture, a leak groove in said valve seat, and a ball valve cooperating with said valve seat and adapted to close and open said bucket aperture, said valve being arranged above said aperture and being of sufficient weight to enable it to normally rest upon its seat against the pressure of the air and/or steam within said trap bucket, the leak groove in said valve seat providing a vent at all times for the air and/or steam within the trap bucket.

3. A steam trap, comprising a casing having a chamber and also having an inlet opening through which water, steam and air enter said chamber and an outlet opening through which water and air leave said chamber, valve mechanism for controlling said outlet opening, an inverted bucket arranged within said trap chamber for actuating said valve mechanism, said bucket being provided in its top wall with an aperture, a valve housing mounted in said aperture and provided with an upper chamber and with a lower, generally vertically disposed vent passageway, said vent passageway communicating at its upper end with said valve housing chamber and at its lower end communicating with the space within the trap bucket, said valve housing being also provided with a valve seat surrounding the upper end of said vent passageway and a ball valve arranged in the chamber of said housing and adapted for cooperating with said valve seat for closing and opening the major part of the upper end of said vent passageway, the remaining part of said passageway being open at all times for vent purposes.

In testimony whereof I hereby affix my signature.

LESLIE P. STRONG.

CERTIFICATE OF CORRECTION.

Patent No. 1,896,528. February 7, 1933.

LESLIE P. STRONG.

It is hereby certified that error appears in the printed specification of the above numbered patent requiring correction as follows: Page 1, line 9, for "invented" read "inverted"; page 2, lines 33 and 34, after "fall" strike out the words "and need not" and insert the same after "not" in line 33; and that the said Letters Patent should be read with these corrections therein that the same may conform to the record of the case in the Patent Office.

Signed and sealed this 2nd day of May, A. D. 1933.

M. J. Moore, (Seal) Acting Commissioner of Patents.